United States Patent [19]
Magorian

[11] 3,728,935
[45] Apr. 24, 1973

[54] CODED INDUCTION ROCKET MOTOR IGNITION SYSTEM

[75] Inventor: William R. Magorian, China Lake, Calif.

[73] Assignee: The United States of America as represented by the Secretary of the Navy

[22] Filed: Jan. 5, 1972

[21] Appl. No.: 215,693

[52] U.S. Cl. ...............89/1.811, 89/1.812, 89/1.814, 89/1.5 D, 102/70.2 R
[51] Int. Cl. ................................................F41f 3/04
[58] Field of Search..........................89/1.811, 1.812, 89/1.814, 1.5 D

[56] References Cited

UNITED STATES PATENTS

| | | |
|---|---|---|
| 3,211,057 | 10/1965 | White, Jr. et al. .....................89/1.5 D |
| 3,387,606 | 6/1968 | Crafts et al. .......................89/1.5 D X |
| 3,667,342 | 6/1972 | Wernock et al. .....................89/1.5 D |
| 3,667,392 | 6/1972 | Grantham............................89/1.5 D |

*Primary Examiner*—Samuel W. Engle
*Attorney*—Richard S. Sciascia et al.

[57] ABSTRACT

An inductor network, for firing missiles to be launched from an aircraft, which includes a series of small electromagnets that are wired in a particular coupling code to minimize accidental triggering of a missile, and are arranged along a weapon attachment pylon for cooperating with a similar set of electromagnets built into a missile.

5 Claims, 4 Drawing Figures

PATENTED APR 24 1973　　3,728,935

3,728,935

CODED INDUCTION ROCKET MOTOR IGNITION SYSTEM

BACKGROUND OF THE INVENTION

This invention relates to a communication system for initiating the launch of rocket propelled missiles from an aircraft. Safety of armament on aircraft carriers is of paramount interest.

Conventional methods for initiating the launch of rocket propelled weapons from aircraft require the connection of an electrical conductor from the launching arm of the aircraft to the weapon. Such connection is normally made manually by a member of the support crew plugging a cable from the aircraft into the missile. However, the missile can fail to launch at the pilot's command if either the cable has not been connected, or if the contacts of the cable or connector have become contaminated. The possibility also exists that the missile may be launched inadvertently if intense electromagnetic radiation is present.

U.S. Pat. No. 3,038,384 discloses an inductor device for firing rocket motors, and U.S. Pats. No. 3,211,057 and No. 3,229,582 disclose inductor systems for transmitting arming signals from an aircraft to a piece of ordnance shielded against radio frequency signals. Nevertheless, these prior type inductor systems fail to provide the degree of safety and reliability necessary to prevent unintentional missile launching, weapon loss, or compatibility as provided by the system of the present invention.

SUMMARY OF THE INVENTION

The present invention is an inductor network for firing rockets to be launched from aircraft. The inductor network includes a series of small electromagnetic coils arranged along a weapon attachment pylon which cooperate with a similar set of coils built into a missile. (The coils are wired in a particular coupling code to minimize the possibility of accidental triggering of the missile.) An alternating current pulse generated within the aircraft produces an electromagnetic signal in the missile to fire an igniting squib.

The technique of this invention can be applied to the communication between any two devices in close proximity where it is not desirable to make direct electrical contact. This technique eliminates the hazard and launching failure due to improper missile installation and unintentional weapon launching. Compatibility with present launching systems and present weapons is maintained permitting the change to be accomplished without obsoleting existing equipment or ordnance.

It is an object of the invention, therefore, to provide improved reliability in initiating rocket motors.

Another object is to provide reduction in operations required to load a missile armament onto aircraft.

A further object is to eliminate weapon loss due to improper operation of equipment aboard the launching aircraft.

Other objects, advantages and novel features of the invention will become apparent from the following detailed description of the invention when considered in conjunction with the accompanying drawings.

DESCRIPTION OF THE PREFERRED EMBODIMENT

Figure 1A:
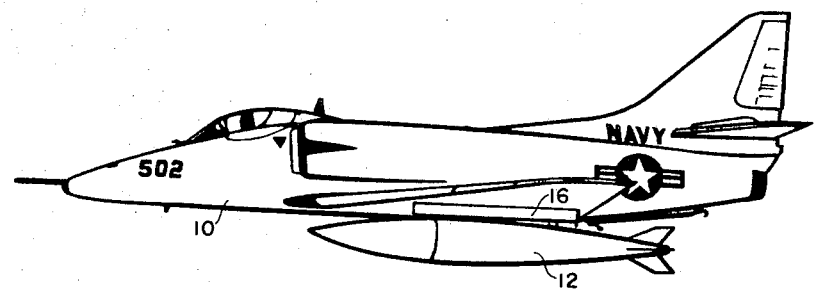
FIG. 1A shows an aircraft with a missile carried under the wing.
Figure 1B:
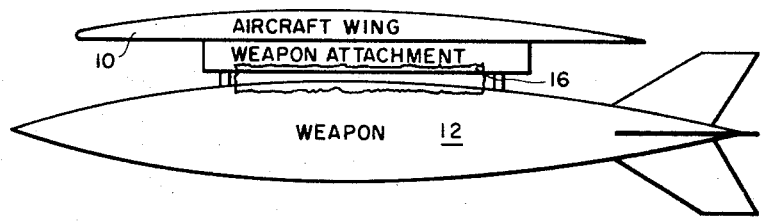
FIG. 1B shows a larger view of an aircraft wing with weapon attachment carrying a weapon.
Figure 2:
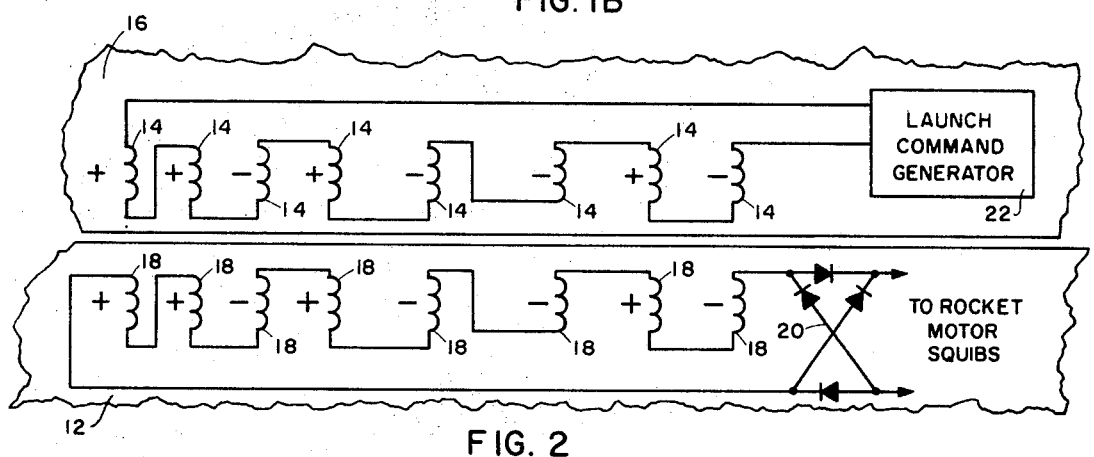
FIG. 2 is a diagrammatic circuit illustration of the present invention showing circuitry in the weapon attachment and in the missile without physical electrical connection between the two.

In this invention there is no physical electrical contact made between the aircraft 10 and weapon 12 shown in FIGS. 1A and 1B. Instead, a series of small electromagnetic coils 14 are mounted along the weapon attachment pylon 16 as shown in FIG. 2. A similar set of pickup coils 18 are built into the missile 12 in such a position as to match the electromagnetic coils 14 of pylon 16 when the missile is attached to the aircraft 10. When in position the orientation of the launcher electromagnets 14 and the missile coils 18 results in a maximum of inductive coupling between the two.

The wiring of the coils is performed in a non-periodic arrangement, i.e., the coils do not all couple with flux orientation in the same direction. This is of primary importance to the invention. The example shown in FIG. 2 shows the coupling code to be +,+,−,+,−,−,+,−, reading from left to right. Since the missile coils 18 are wired the same as those in the launcher pylon 16, voltage applied to the bridge rectifier network 20 will be N times the voltage induced across each pickup coil 18, where N is the number of coils used. An interfering magnetic field would be uniform across these pickup coils. In prior type devices such interfering magnetic field could possibly trigger the firing of the missile. However, since half of the coils are wired to produce a positive voltage in this field and the other coils to produce a negative voltage, the voltage at the rectifier bridge network 20 is the summation of all the coils and is thus zero. The code or sequence of the coils is non-periodic to prevent a non-uniform field from accidentally duplicating the code.

The magnetic material of pickup coils 18 is chosen to saturate at a flux level which will produce a maximum single output voltage of (1/N) of that necessary to initiate the missile rocket motor squib or the like.

A launch signal generated in the aircraft is produced by a launch command generator 22 and consists of a pulse of alternating current of sufficient amplitude to cause electromagnetic coils 14 in the weapon attachment to saturate the pickup coils 18 and of sufficient duration so as to supply the required energy to the missile rocket motor initiator.

A second feature of this system is the prevention of weapon launch without the aircraft being in a condition to control the launched missile. The problem addressed here is the result of the requirement that the weapon pylon 16 must be used with a variety of ordnance and that all of the various weapons be fired by the same switch in the aircraft cockpit.

Figure 3:
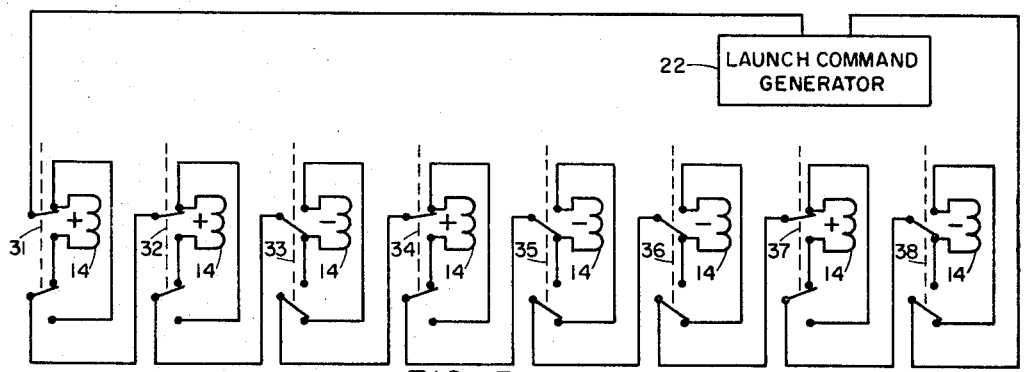
FIG. 3 shows a simple switching arrangement for selecting the code sequence for the circuitry of FIG. 2.

In most prior cases a selector switch must be preset by the pilot to correspond to the ordnance he is carrying and the reliance of the launched weapon on other equipment carried in the aircraft even after launch. One example of this is in comparing the use of a missile of the type which after being launched guides on the target by signals produced in the missile alone, and a missile of the type which requires that the target be illuminated by radar from the launching aircraft. If the radar is not operating at the time of launch the missile will not guide. The system of this invention can prevent such condition from occurring by using a different code sequence in each type of missile used. The coils in the launcher 16 would be connected into the corresponding code of the type of missile being used by switching control means in the launch command generator only after all the aircraft equipment is set to the proper condition for that type of missile. FIG. 3 is a simple diagrammatic view showing a switching arrangement using relay controlled pairs of switches 31, 32, 33, 34, 35, 36, 37, 38 to connect coils 14 together to provide the proper code sequence to correspond with the code (i.e., coil arrangement) in the missile being used. As shown in FIG. 3, the relays are switched to provide the same code arrangement as shown in FIG. 2. Relay switches 31, 32, 34 and 37 are switched to provide + polarity of their respective coils and relay switches 33, 35, 36 and 38 are switched to provide -polarity of their respective coils, resulting in a code sequence of +, +, −, +, −, −, +, −. This arrangement can be used to provide any desired code sequence.

What is claimed is:

1. A firing system for missiles to be launched from a weapon attachment pylon on an aircraft, comprising:
   a. an inductor network in the attachment pylon of an aircraft which includes an arrangement of a plurality of electromagnetic coils connected in series along said attachment pylon to provide a coded sequence of positive and negative electromagnetic polarities when activated;
   b. means in the aircraft connected to said inductive network for activating the electromagnetic coils;
   c. a plurality of pickup coils in a missile to be launched from the attachment pylon, said pickup coils being oriented such that when the missile is attached to said pylon the pickup coils in the missile are in close proximity to electromagnetic coils in the pylon which result in a maximum inductive coupling therebetween when the electromagnetic coils are activated;
   d. said plurality of pickup coils being arranged to provide a coded sequence of electromagnetic polarities, wherein activation of said electromagnetic coils in the same coded sequence as said arrangement of pickup coils results in saturation of the pickup coils to provide a voltage for firing said missile.

2. A system as in claim 1 wherein the number of positive and negative polarities in said non-periodic coded sequence of pickup coil polarities are equal resulting in zero total voltage generation from an interfering uniform magnetic field.

3. A system as in claim 1 wherein said coded sequence of electromagnetic and pickup coils is non-periodic to prevent a non-uniform interfering magnetic field from accidentally duplicating the coded sequence.

4. A system as in claim 1 wherein switching means are provided to change the polarity and thus the coded sequence of said electromagnetic coils.

5. A system as in claim 1 wherein said pickup coil arrangement is connected to a rectifier bridge network which in turn is connected to the missile motor initiator.

* * * * *